United States Patent [19]

Meijer

[11] Patent Number: 4,669,736
[45] Date of Patent: Jun. 2, 1987

[54] STIRLING ENGINE WITH IMPROVED SEALING PISTON RING ASSEMBLY

[75] Inventor: Roelf J. Meijer, Ann Arbor, Mich.

[73] Assignee: Stirling Thermal Motors, Inc., Ann Arbor, Mich.

[21] Appl. No.: 814,342

[22] Filed: Dec. 27, 1985

[51] Int. Cl.⁴ .............................. F16J 9/06; F16J 9/08; F16J 15/40

[52] U.S. Cl. ........................ 277/27; 277/157; 277/165; 277/193; 277/215; 277/216

[58] Field of Search .................. 277/188 R, 193, 197, 277/192, 216, 215, 165, 222, 217, 157, 27; 92/193

[56] References Cited

U.S. PATENT DOCUMENTS

| 1,988,726 | 1/1935 | Godron | 277/215 |
| 2,348,939 | 5/1944 | Thompson | 277/188 R |
| 2,349,170 | 5/1944 | Jackman | 277/188 A X |
| 2,466,428 | 4/1949 | Hufferd et al. | 277/165 |
| 3,455,565 | 7/1969 | Jepsen | 277/222 X |
| 3,522,950 | 8/1970 | Scheck, Jr. | 277/188 R |

FOREIGN PATENT DOCUMENTS

| 487709 | 12/1929 | Fed. Rep. of Germany | 277/188 R |
| 643144 | 9/1928 | France | 277/193 |
| 667529 | 3/1952 | United Kingdom | 277/222 |

Primary Examiner—Allan N. Shoap
Attorney, Agent, or Firm—Harness, Dickey & Pierce

[57] ABSTRACT

A sealing piston ring assembly for a Stirling engine which is effective to maintain the required pressure differential on opposite sides of the piston while still enabling free reciprocating movement of the piston within the cylinder. The piston ring assembly consists of a main annular ring member formed of metal and pair of sealing ring units on opposite end faces of the main ring member that are formed of low frictional material and are continuously urged into sealing engagement with the cylinder wall. Each sealing ring unit comprises a pair of thin axially engaged annular sealing ring members which are slotted so that they have spaced ends and are circumferentially expansible to maintain the necessary seal with the cylinder wall. In each unit, the slots in the sealing ring members are circumferentially spaced so that they do not affect the ability of the sealing ring unit to effectively seal against one wall of the piston ring groove, the units being alternately engageable with the piston ring groove walls during reciprocation of the piston. The slots can be particularly shaped to insure this necessary seal.

6 Claims, 7 Drawing Figures

STIRLING ENGINE WITH IMPROVED SEALING PISTON RING ASSEMBLY

BACKGROUND AND SUMMARY OF THE INVENTION

This invention relates generally to closed cycle engines having pistons reciprocating within cylinders, and particularly relates to an improved sealing piston ring assembly located between a piston and a cylinder wall. The invention is particularly useful in a Stirling engine.

A Stirling engine is a closed cycle engine. This means that during every cycle of the engine, the same working medium namely, a gas such as air, hydrogen or helium, is compressed, cooled, heated and expanded. In such an engine, good piston seals are a necessity.

In a Stirling engine, internal seals cannot be lubricated with oil because oil will affect the cycle. A dry piston ring seal is thus required. In such seals, it is known to employ a material known as "Rulon" which is a trademark identifying a heat stable plastic polymer of fluorine and ethylene mixed with glass powder and other materials. Rulon is a solid material that has a very low coefficient of friction and performs well as a seal engaging metal.

However, in double acting engines, such as a Stirling engine, simple piston rings formed of Rulon have proved to be unsatisfactory because a leak in one direction always results in the development of pressure differentials of unequal magnitudes. When two Rulon piston rings are employed, higher friction is encountered.

The principal object of this invention, therefore, is to provide an improved sealing piston ring assembly for Stirling engines in which an annular metal piston ring member cooperates with pairs of thin annular sealing ring members formed of low friction material, such as Rulon, and positioned on opposite end faces of the metal piston ring member so that when the piston is moving in one direction, one of the sealing ring units seals against the piston ring groove and when the piston is moving in the opposite direction, the other sealing ring unit seals against the other side of the piston ring groove. The metal piston ring member is maintained in a clearance relation with the cylinder wall and the sealing ring units are formed of very thin annular members so that they do not create significantly high frictional forces on the cylinder wall.

The result is a very effective piston ring assembly that forms a seal on the opposite sides of the piston and which can be operated with a minimum of frictional interference.

Further objects, features and advantages of the invention will become apparent from a consideration of the following description and the appended claims when taken in connection with the accompanying drawing in which:

Figure 1:
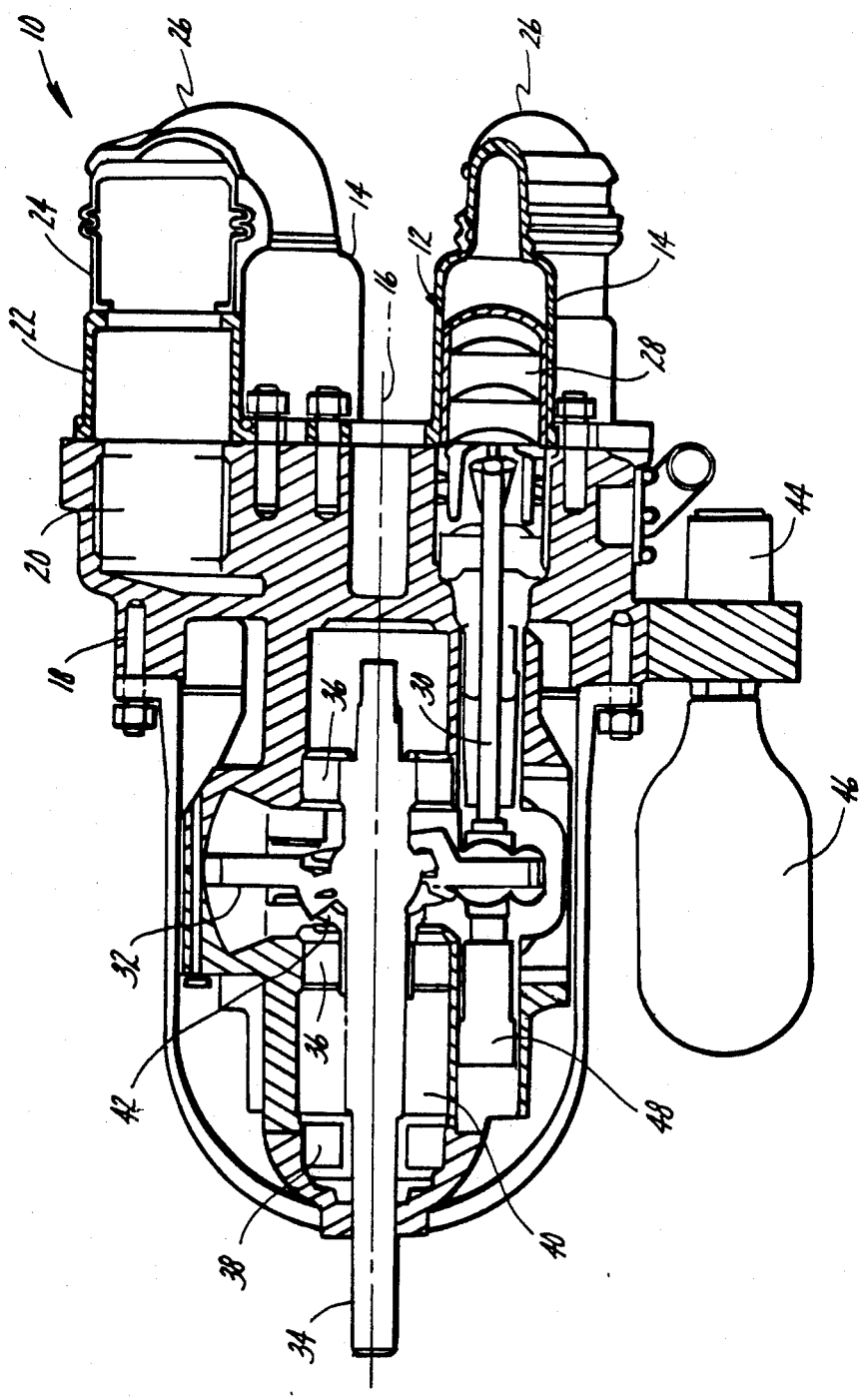
FIG. 1 is a longitudinal sectional view of a Stirling engine containing the improved sealing piston ring assemblies according to the present invention.

With reference to the drawing, a Stirling engine, indicated generally at 10, is illustrated in FIG. 1 containing a piston and cylinder assembly 12. The engine 10 is like the engine shown in U.S. Pat. No. 4,481,771 assigned to the assignee of this application.

More particularly, engine 10 contains four substantially parallel cylinders 14 disposed in a square cluster about a central axis 16 within a drive mechanism housing 18. Associated with each cylinder 14 and located on an end surface of drive mechanism housing 18 is a heat exchanger combination comprising a cooler 20, a regenerator 22, and a flexible heat exchanger 24 located in a substantially parallel orientation with respect to each cylinder. A short rigid hot connecting duct 26 connects a cylinder 14 to a flexible heat exhcanger 24. The regenerator 22, flexible heat exchanger 24, hot connecting duct 26 and cylinder 14 form a separate apparatus while each cooler 20 is located within drive mechanism housing 18.

Located within each cylinder 14 is a reciprocating piston 28 and a connecting rod 30 rigidly affixed thereto. A swashpate 32 converts the reciprocating axial motion of each piston 28 to rotary motion of an output shaft 34 which is journaled by main bearings 36 and a thrust bearing 38. The angle of swashplate 32 is variable over an angular range, for example from 0° to 22°, by rotating swashplate 32 relative to a tilted section of output shaft 34 to vary the power output of the engine. This rotation is effected by a hydraulic stroke converter 40 and transmitted to swashplate 32, by a bevel gear 42. As the angle of swashplate 32 increases, the piston stroke also increases causing engine power output to increase due to such increased stroke and the increase in ratio of volume swept by the pistons to total volume of engine working fluid.

Hydraulic fluid is supplied to and returned from stroke converter 40 by concentric tunnels (not shown) in output shaft 34. Fluid supply and return is controlled by power control valve 44 and an adjacent accumulator 46. A crosshead 48 slidably connects each piston connecting rod 30 to swashplate 32.

In operation, differential pressure is applied to opposite sides of each piston in accordance with the operating cycle, and the engine converts a portion of the energy input into useful work at the output shaft. In order to efficiently operate the engine, sealing of each piston to the wall of the cylinder within which it reciprocates is important. Accordingly, it has been known to use a piston ring seal to resist leakage of fluid from one axial side of the piston to the opposite side. However, the objective of providing an adequate seal can be inconsistent with the objective of efficiently operating the engine where the effectiveness of the seal depends upon a forceful engagement of the piston ring with the axial wall of the cylinder.

The present invention is directed to an improvement in the piston ring assembly for maintaining forceful sealing effectiveness irrespective of which axial side of the piston is subject to the high pressure condition. Thus, during each full cycle of the engine, the necessary pressure differential is maintained.

Figure 2:
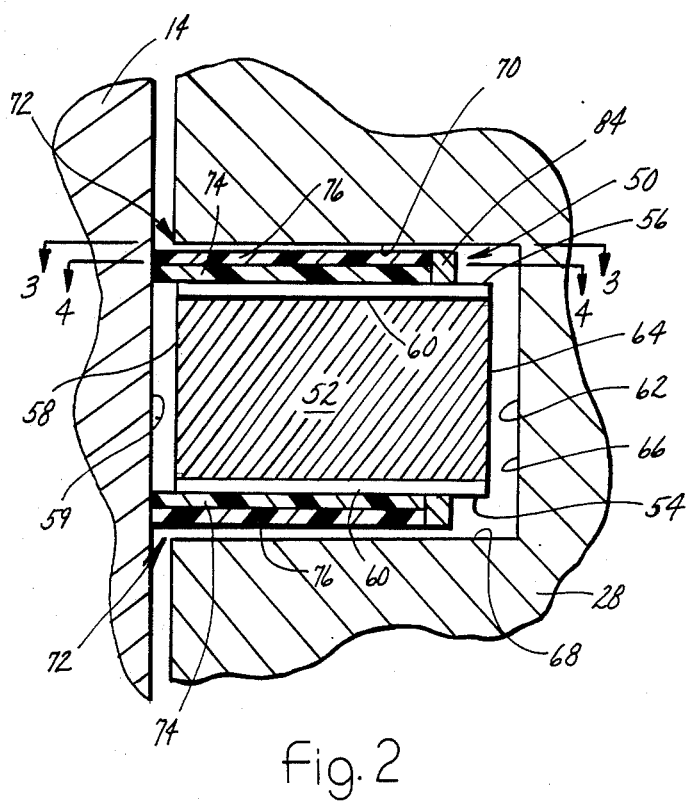
FIG. 2 is an enlarged fragmentary sectional view taken radially through a piston ring assembly according to the present invention and illustrating the sealing ring units in contact with the wall of the cylinder within which the piston reciprocates. The proportions are not necessarily to scale so that clarity in the illustration is obtained.
Figure 3:
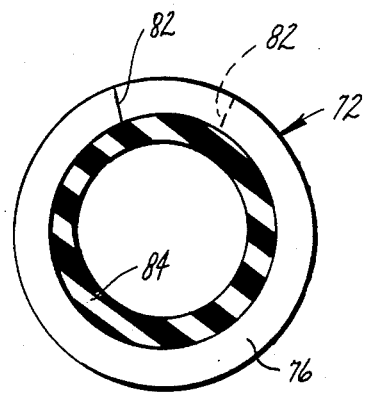
FIG. 3 is an end view of one of the sealing ring units as seen from substantially the line 3—3 in FIG. 2 with the backing ring in the unit being broken away and shown in section for the purpose of clarity.
Figure 4:
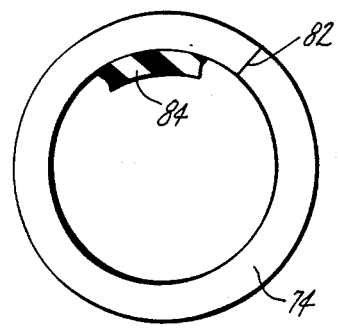
FIG. 4 is a view like FIG. 3 as seen from substantially the line 4—4 in FIG. 2.

The improved sealing piston ring assembly of this invention, indicated generally at 50 is illustrated in FIG. 2 in assembly relation with the cylinder 14 and the piston 28. The piston ring assembly 50 consists of a main piston ring member 52, formed of metal and of annular solid shape having oppositely facing generally flat annular end surfaces 54 and 56 and an outwardly facing generally cylindrical surface 58 which confronts the wall 59 of the cylinder 14. The faces 54 and 56 are formed with radially extending grooves 60 and the main piston ring member 52 is positioned in an annular groove 62 in the piston 28.

The groove 62 has a cylindrical inner wall 62 and a pair of annular end walls 68 and 70.

A pair of sealing ring units 72 are positioned adjacent the ring member faces 54 and 56 and between the ring member 52 and the piston walls 68 and 70. Since the units 72 are identical, only one of the units 72 will be described in detail, with like numerals on the units indicating like parts.

Figure 5:
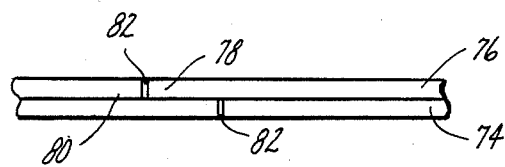
FIG. 5 is a fragmentary side elevational view of a sealing ring unit in the assembly shown in FIG. 2.

Each unit 72 consists of a pair of thin axially engaged annular sealing ring members 74 and 76, the ring member 74 being positioned adjacent the main ring member 52 and thus being described hereinafter as an inner sealing ring member and the member 76 being referred to as the outer sealing ring member. Each of the ring members 74 and 76 is formed of a low coefficient of friction material, such as Teflon or Rulon, Rulon being preferred because it has good wear characteristics when engaged with metal. Each of the ring members 74 and 76 is of annular shape having spaced ends 78 and 80 separated by a slot 82 (FIG. 5). The non-continuous nature of the rings 74 and 76 and the fact that they have ends 78 and 90 which are separated enables expansion of the ring members 74 and 76 in a circumferential direction.

The use of two ring members 74 and 76 in each of the units 72 enables the use of ring members 74 and 76 with separated ends 78 and 80. As shown in FIG. 5, the slots 82 at the ends of the ring members 74 and 76 are angularly displaced so that they do not adversely affect the sealing ability of the unit 72 in a direction axially of the piston 28. This prevents the flow of gas from the high pressure side of the unit 72 to the low pressure side of at least one of the units 72 during each cycle. A backing ring 84, formed of an elastic material, such as rubber, which is annular in shape and of an endless configuration, functions to exert a continuous force on the rings 74 and 76 in a direction to expand the ring members and urge the circumferentially outer edges of the ring members into sealing engaement with the cylinder wall 59.

Thus, when the engine 10 is operated, pressure differential exists across the opposite axial faces of the member 52 so that the piston ring assembly 50 will be positioned against one or the other of the groove walls 68 and 70 depending upon the direction of the pressure differential. Assume that the assembly 50 is in sealing engagement with the groove wall 70.

By virtue of the gap between the piston ring assembly 50 and the groove wall 68, fluid under pressure will be present in the groove 62 and will communicate freely with the inner and outer sides of the main piston ring member 52 through the grooves 60. The sealing ring assembly 72 adjacent groove wall 70 maintains the required pressure seal because the ring members 74 and 76 in the assembly 72 are sealed between the surfaces 56 and 70 and against the cylinder wall 59. Any leakage of gas along any of the ring member faces in the sealing unit 72 will not flow past the unit 72 by virtue of the angularly displaced relation of the slots 82.

It is readily apparent that this same situation exists when the piston ring assembly 50 is sealed against the groove wall 62 instead of the wall 70 as described in the above illustration.

Figure 6:
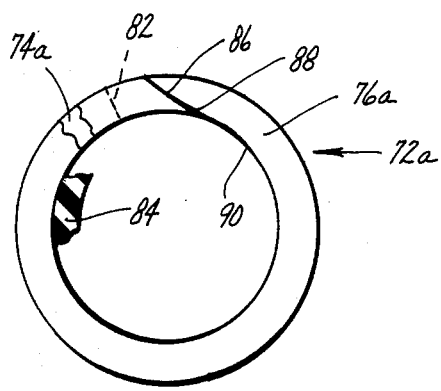
FIGS. 6 and 7 are end views like FIG. 3 of modified forms of sealing ring units useable in the improved sealing piston ring assembly of this invention.

FIG. 6 illustrates a modified form of the sealing ring units, indicated generally at 72a. In the unit 72a, the inner ring 74a is like the ring 74 described above in that its ends are separated by a radially extending straight slot 82. However, the outer ring 76a has its ends separated by an elongated curved slot 86 which has an inner end section 88 that is tangent to the radially inner edge 90 of the ring member 76a. The slot 86 provides a longer path between the adjacent ends of the ring member 76a and further precludes the possibility of leakage past the ring 76a.

Figure 7:
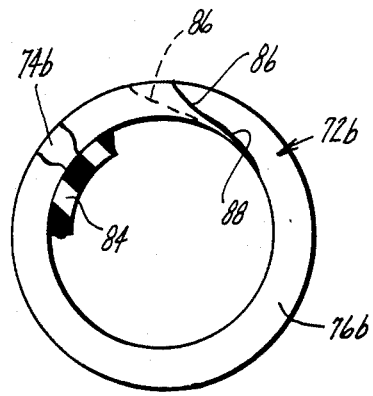

In FIG. 7, a further modified sealing ring assembly 72b is illustrated in which both of the ring members 74b and 76b are provided at their ends with curved slots 86 which have inner end sections 88 that are tangent to the inner edge of the sealing ring. Sealing ring members like those illustrated in FIGS. 6 and 7 are advantageous in certain environments.

From the above description, it is seen that this invention provides a sealing piston ring assembly 50 which is advantageous in that it is operable to maintain the desired pressure differential in a Stirling engine during a prolonged service life of the engine. In addition, the area of sealing contact between the piston ring assembly and the cylinder wall 59 is minimized so as to minimize the forces required to reciprocate the piston. This also minimizes the piston ring wear and prolongs the service life of the engine.

What is claimed is:

1. In an engine having a reciprocating piston axially stroking within a walled cylinder by a pressure differential of a working fluid acting on opposite first and second axial sides of the piston, an annular sealing piston ring assembly disposed in an annular piston ring groove around the piston having a cylindrical inner wall, said piston ring assembly for sealing between the piston and the wall of the cylinder to resist leakage of the working fluid past the piston, wherein said sealing piston ring assembly comprises a main piston ring member formed of metal and having oppositely axially facing generally flat annular end surfaces, a radially outwardly facing generally cylindrical surface confronting the cylinder wall and a radially inwardly facing generally cylindrical surface, said main piston ring member being positioned in the piston ring groove so that said outwardly facing surface is in a clearance relation with the cylinder wall and said inwardly facinig surface is in clearance relation with the groove inner wall, first and second sealing ring units positioned adjacent said end faces and in sealing engagement with the cylinder wall, each of said units including a pair of thin axially engaged annular sealing ring members formed of low frictional material and having radially spaced ends enabling expansion of said ring members in a circumferential direction, the combined axial height of said piston ring member and said units being less than the axial height of said groove, said sealing ring members in each unit being relatively arranged so that the spaced ends of one ring member in the unit are angularly displaced from the spaced ends of the other ring member in the unit, and a respective circumferentially expansible backing ring engaged with the radially inner edge of each of said units, each backing ring defining a clearance with the groove inner wall, wherein when a fluid pressure acting on the first axial side of the piston is greater than the fluid pressure acting on the second axial side of the piston, the fluid is permitted to leak past said first sealing ring unit and said main piston ring member to act on said second sealing ring unit to urge it into sealing engagement with the piston and the cylinder wall, and wherein when a fluid pressure acting on the second axial side of the piston is greater than the fluid pressure acting on the first axial side of the piston, fluid is permitted to leak past said second sealing ring unit and said main piston ring member to act on said first sealing ring unit to urge it into sealing engagement with the piston and the cylinder wall.

2. The piston ring assembly set forth in claim 1 wherein the spaced ends of said sealing ring members are separated by a slot of predetermined shape.

3. The piston ring assembly according to claim 2 wherein the shape of said slot is substantially straight and extends in a direction generally radially of said sealing ring members.

4. The piston ring assembly according to claim 2 wherein the shape of said slot is generally curved terminating at the radially inner end thereof in a section substantially tangent to the radially inner edges of the sealing ring.

5. The piston ring assembly according to claim 1 wherein said backing ring is formed of an elastic material which urges the sealing rings radially outwardly into sealing engagement with said cylinder wall.

6. The piston ring assembly according to claim 1 wherein said end faces of said main piston ring member are formed with radially extending grooves communicating said cylindrical surface with said piston ring groove.

* * * * *